(12) United States Patent
Kamen et al.

(10) Patent No.: US 6,543,564 B1
(45) Date of Patent: Apr. 8, 2003

(54) BALANCING PERSONAL VEHICLE

(75) Inventors: Dean L. Kamen, Bedford, NH (US); Douglas Field, Bedford, NH (US); Richard Kurt Heinzmann, Francetown, NH (US)

(73) Assignee: Deka Products Limited Partnership, Manchester, NH (US)

( * ) Notice: Subject to any disclaimer, the term of this patent is extended or adjusted under 35 U.S.C. 154(b) by 0 days.

(21) Appl. No.: 09/456,347

(22) Filed: Dec. 8, 1999

Related U.S. Application Data

(63) Continuation-in-part of application No. 09/325,976, filed on Jun. 4, 1999, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,693, filed on May 27, 1994, now Pat. No. 5,701,965.

(51) Int. Cl.⁷ .............................................. B62D 33/067
(52) U.S. Cl. ..................... 180/89.13; 180/327; 180/333; 280/5.513
(58) Field of Search ........................... 180/89.13, 89.14, 180/315, 327, 328, 333, 180, 181, 908, 65.1; 280/5.501, 6.154, 5.507, 5.513; 701/124

(56) References Cited

U.S. PATENT DOCUMENTS

| | | |
|---|---|---|
| 2,742,973 A | 4/1956 | Johannesen |
| 3,145,797 A | 8/1964 | Taylor |
| 3,260,324 A | 7/1966 | Suarez |
| 3,288,234 A | 11/1966 | Feliz |
| 3,348,518 A | 10/1967 | Forsyth et al. |
| 3,374,845 A | 3/1968 | Selwyn |
| 3,399,742 A | 9/1968 | Malick |
| 3,580,344 A | 5/1971 | Floyd |
| 4,020,914 A | 5/1977 | Trautwein |
| 4,088,199 A | 5/1978 | Trautwein |
| 4,109,741 A | 8/1978 | Gabriel |
| 4,151,892 A | * 5/1979 | Francken .................... 180/333 |

(List continued on next page.)

FOREIGN PATENT DOCUMENTS

| | | |
|---|---|---|
| DE | 31 28 112 A1 | 2/1983 |
| DE | 32 42 880 A1 | 6/1983 |
| EP | 0 109 927 | 7/1984 |

(List continued on next page.)

OTHER PUBLICATIONS

Kawaji, S., *Stabilization of Unicycle Using Spinning Motion, Denki Gakkai Ronbushi, D,* vol. 107, Issue 1, Japan (1987), pp. 21–28.

(List continued on next page.)

*Primary Examiner*—Paul N. Dickson
*Assistant Examiner*—David R. Dunn
(74) *Attorney, Agent, or Firm*—Bromberg & Sunstein LLP

(57) ABSTRACT

A transportation vehicle for transporting an individual over ground having a surface that may be irregular. The vehicle has a support platform for supporting the subject and the support platform is coupled to a ground-contacting module at a pivot. While the ground-contacting module may be statically stable, balance of the support platform with respect to the ground-contacting module is maintained by motion of the ground-contacting module in response to leaning of the support platform. A motorized drive coupled to the ground-contacting module causes locomotion of the vehicle and the subject therewith over the surface, while a control loop, in which the motorized drive is included, dynamically enhances stability in the fore-aft plane by operation of the motorized drive in connection with the ground-contacting module. In the event of failure of the control loop, the pivot connection of the support platform to the ground-contacting module may be locked, thereby ensuring stability of the static assembly.

10 Claims, 8 Drawing Sheets

U.S. PATENT DOCUMENTS

| | | | |
|---|---|---|---|
| 4,161,322 A | 7/1979 | Ekeborg et al. | |
| 4,222,449 A | 9/1980 | Feliz | |
| 4,354,569 A | 10/1982 | Eichholz | |
| 4,375,840 A | 3/1983 | Campbell | |
| 4,566,707 A | 1/1986 | Nitzberg | |
| 4,624,469 A | 11/1986 | Bourne, Jr. | |
| 4,657,272 A | 4/1987 | Davenport | |
| 4,709,772 A | 12/1987 | Brunet | |
| 4,790,548 A | 12/1988 | Decelles et al. | |
| 4,794,999 A | 1/1989 | Hester | |
| 4,802,542 A | 2/1989 | Houston et al. | |
| 4,809,804 A | 3/1989 | Houston et al. | |
| 4,874,055 A | 10/1989 | Beer | |
| 4,998,596 A | 3/1991 | Miksitz | |
| 5,111,899 A | 5/1992 | Reimann | |
| 5,248,007 A | 9/1993 | Watkins et al. | |
| 5,314,034 A | 5/1994 | Chittal | |
| 5,350,033 A | 9/1994 | Kraft | |
| 5,366,036 A | 11/1994 | Perry | |
| 5,441,298 A * | 8/1995 | Miller et al. | 280/5.501 |
| 5,701,965 A | 12/1997 | Kamen et al. | |
| 5,791,425 A | 8/1998 | Kamen et al. | |
| 5,921,338 A * | 7/1999 | Edmondson | 180/65.5 |
| 5,971,091 A | 10/1999 | Kamen et al. | |
| 5,975,225 A * | 11/1999 | Kamen et al. | 180/7.1 |
| 6,003,624 A | 12/1999 | Jorgensen et al. | |
| 6,068,280 A * | 5/2000 | Torres | 280/304.1 |

FOREIGN PATENT DOCUMENTS

| | | | | |
|---|---|---|---|---|
| EP | 0 193 473 | | 9/1986 | |
| EP | 0 257 791 | | 7/1987 | |
| EP | 0 537 698 A1 | | 4/1993 | |
| FR | 980 237 | | 5/1951 | |
| FR | 2 502 090 | | 9/1982 | |
| GB | 1213930 | | 11/1970 | |
| GB | 2 139 576 A | | 11/1984 | |
| JP | 52-44933 | | 10/1975 | |
| JP | 57-87766 | | 6/1982 | |
| JP | 0255580 | | 12/1985 | |
| JP | 63-305082 | | 12/1988 | |
| JP | 6-105415 | | 12/1989 | |
| JP | 2-190277 | | 7/1990 | |
| JP | 4-201793 A * | | 7/1992 | 180/7.1 |
| JP | 7255780 | | 3/1995 | |
| WO | WO 89/06117 | | 7/1989 | |
| WO | WO 96/23478 | | 8/1996 | |

OTHER PUBLICATIONS

Schoonwinkel, A., *Design and Test of a Computer–Stabilized Unicycle*, Stanford University (1988), UMI Dissertation Services.

Vos, D., *Dynamics and Nonlinear Adaptive Control of an Autonomous Unicycle*, Massachusetts Institute of Technology, 1989.

Vos, D., *Nonlinear Control of an Autonomous Unicycle Robot: Practical Issues*, Massachusetts Institute of Technology, 1992.

Koyanagi et al., *A Wheeled Inverse Pendulum Type Self–Contained Mobile Robot and its Posture Control and Vehicle Control*, The Society of Instrument and Control Engineers, Special issue of the $31^{st}$ SICE Annual Conference, Japan 1992, pp. 13–16.

Koyanagi et al., *A Wheeled Inverse Pendulum Type Self–Contained Mobile Robot*, The Society of Instrument and Control Engineers, Special issue of the $31^{st}$ SICE Annual Conference, Japan 1992, pp. 51–56.

Koyanagi et al., *A Wheeled Inverse Pendulum Type Self–Contained Mobile Robot and its Two Dimensional Trajectory Control*, Proceeding of the Second International Symposium on Measurement and Control in Robotics, Japan 1992, pp. 891–898.

News article *Amazing Wheelchair Goes Up and Down Stairs* no date.

Osaka et al., *Systems and Control*, vol. 25, No. 3, Japan 1981, pp. 159–166 (Abstract Only).

Roy et al., *Five–Wheel Unicycle System*, Medical & Biological Engineering & Computing, vol. 23, No. 6, United Kingdom 1985, pp. 593–596.

Kawaji, S., *Stabilization of Unicycle Using Spinning Motion*, Denki Gakkai Ronbushi, D, vol. 107, Issue 1, Japan 1987, pp. 21–28 (Abstract Only).

Kanoh *Adaptive Control of Inverted Pendulum*, Computrol, vol. 2, pp. 69–75 (1983).

Yamafuji *A Proposal for Modular–Structured Mobile Robots for Work that Principally Involve a Vehicle with Two Parallel Wheels*, Automation Technology, vol. 20, pp. 113–118 (1988).

Yamafuji & Kawamura *Study of Postural and Driving Control of Coaxial Bicycle*, Paper Read at Meeting of Japan Society of Mechanical Engineering (Series C), vol. 54, No. 501, pp. 1114–1121 (May, 1988).

Yamafuji et al. *Synchronous Steering Control of a Parallel Bicycle*, Paper Read at Meeting of Japan Society of Mechanical Engineering (Series C), vol. 55, No. 513, pp. 1229–1234 (May, 1989).

Momoi & Yamafuji *Motion control of the Paralell Bicycle–Type Mobile Robot Composed of a Triple Inverted Pendulum*, Paper Read at Meeting of Japan Society of Mechanical Engineering (Series C), vol. 57, No. 541, pp. 154–159 (Sep., 1991).

* cited by examiner

BALANCING PERSONAL VEHICLE

This application is a continuation in part of U.S. application Ser. No. 09/325,976, filed Jun. 4, 1999, which is a continuation in part of U.S. application Ser. No. 08/479,901, filed Jun. 7, 1995, now issued as U.S. Pat. No. 5,975,225, which is a continuation in part of U.S. application Ser. No. 08/384,705, filed Feb. 3, 1995, now issued as U.S. Pat. No. 5,971,091, which is a continuation in part of U.S. application Ser. No. 08/250,693, filed May 27, 1994, now issued as U.S. Pat. No. 5,701,965.

TECHNICAL FIELD

The present invention pertains to vehicles and methods for transporting individuals, and more particularly to vehicles and methods employing control loops in which a motorized drive is included.

BACKGROUND ART

A wide range of vehicles and methods are known for transporting human subjects. Typically, such vehicles rely upon static stability, being designed so as to be stable under all foreseen conditions of placement of their ground-contacting members. Thus, for example, the gravity vector acting on the center of gravity of an automobile passes between the points of ground contact of the automobile's wheels, the suspension keeping all wheels on the ground at all times, and the automobile is thus stable. Alternatively, dynamic stability may be maintained by action of the user, as in the case of a bicycle, or, otherwise, by a control loop, as in the case of the human transporter described in U.S. Pat. No. 5,701,965 and U.S. patent application Ser. No. 08/384,705, filed Feb. 3, 1995, which are herein incorporated by reference.

The balancing vehicles described in these references, however, lack static stability. Referring, for example, to FIG. 1, wherein a prior art personal transporter is shown and designated generally by numeral 18, a subject 10 stands on a support platform 12 and holds a grip 14 on a handle 16 attached to the platform 12, so that the vehicle 18 of this embodiment may be operated in a manner analogous to a scooter. A control loop may be provided so that leaning of the subject results in the application of torque to wheel 20 about axle 22 thereby causing an acceleration of the vehicle. Vehicle 18, however, is statically unstable, and, absent operation of the control loop to maintain dynamic stability, subject 10 will no longer be supported in a standing position and will fall from platform 12. Another prior art balancing vehicle is shown in FIG. 2 and designated generally by numeral 24. Personal vehicle 24 shares the characteristics of vehicle 12 of FIG. 1, namely a support platform 12 for supporting subject 10 and grip 14 on handle 16 attached to platform 12, so that the vehicle 18 of this embodiment may also be operated in a manner analogous to a scooter. FIG. 2 shows that while vehicle 24 may have clusters 26 each having a plurality of wheels 28, vehicle 24 remains statically unstable and, absent operation of a control loop to maintain dynamic stability, subject 10 will no longer be supported in a standing position and will fall from platform 12.

By way of contrast, other prior art vehicles may be statically stable, such as automobiles or the stair-climbing vehicle described in U.S. Pat. No. 4,790,548 (Decelles et al.). These statically stable vehicles, however, lack a balancing capability. They also lack the capability for motion of the vehicle to be governed by leaning of the operator.

In the case of statically unstable balancing vehicles, considerations of operator safety require adoption of special stratagems, such as those described in copending applications, Ser. Nos. 09/184,488, 08/892,566, and 09/168,551, for the event of failure of certain system components.

SUMMARY OF THE INVENTION

In accordance with preferred embodiments of the present invention, there is provided a vehicle for transporting a human subject over a surface that may be irregular. The vehicle has a support platform for supporting the subject, with fore-aft and lateral planes defined by the orientation of the support platform. Additionally, the vehicle has a ground-contacting module pivotably coupled to the support platform, for suspending the support platform over the surface, the support platform and the ground-contacting module being components of an assembly, and a motorized drive arrangement, mounted to the assembly, for causing locomotion of the assembly and the subject over the surface. Finally, the vehicle has a control loop, in which the motorized drive arrangement is included, for dynamically maintaining stability of the assembly by operation of the motorized drive arrangement in such a manner as to cause a specified acceleration of the assembly.

In accordance with alternate embodiments of the invention, the vehicle may also have a pivot for pivotal coupling of the support platform to the ground-contacting module and a locking mechanism for restricting motion of the support platform with respect to the ground-contacting module. The locking mechanism for restricting motion of the support platform may be activated upon interruption of power to the control loop. The ground-contacting module may include at least one wheel aft, and at least one wheel forward, of a vertical line through the center of gravity of the assembly under static conditions. The ground-contacting module may have a first wheel rotatable about a first axis and a second wheel rotatable about a second axis, the second axis being non-colinear with the first axis.

In accordance with further alternate embodiments of the invention, the control loop may be configured so that fore and aft motion of the vehicle is controlled by fore and aft leaning of the support platform as affected by the subject.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

Figure 1:
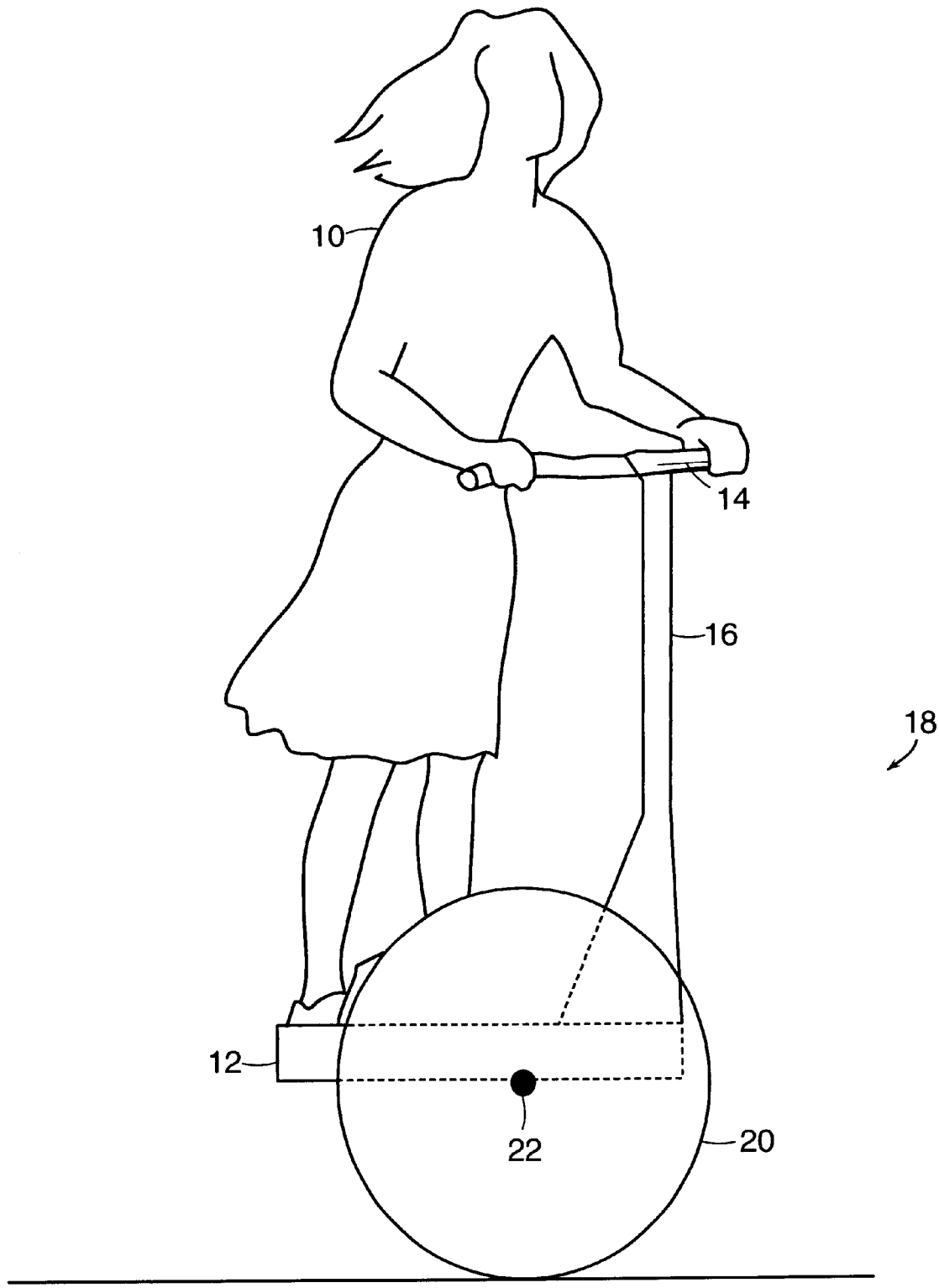
FIG. 1 is a side view of a prior art personal vehicle lacking a stable static position in which the subject remains in a standing position thereon.
Figure 2:
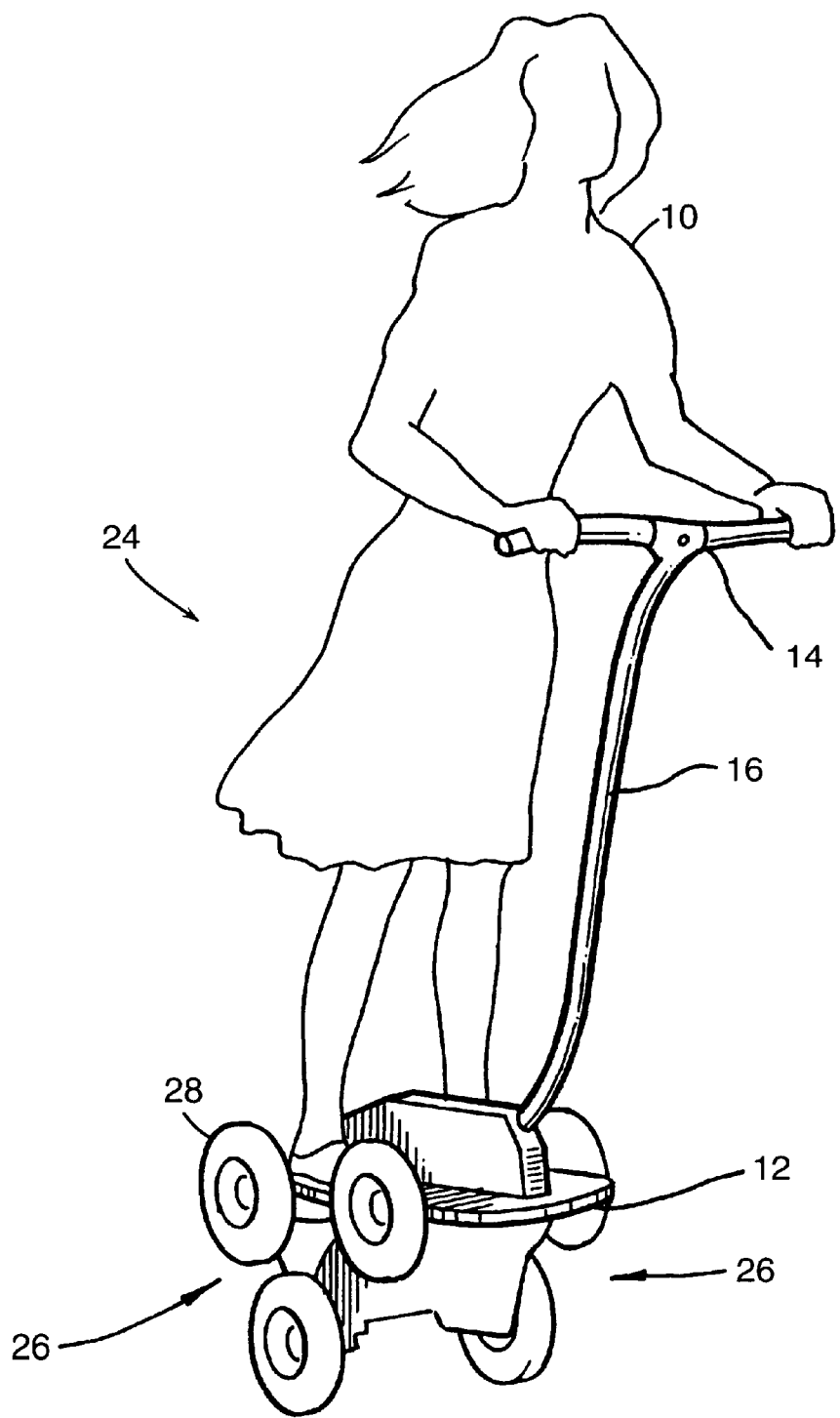
FIG. 2 is a perspective view of a second prior art personal vehicle also lacking a stable static position in which the subject remains in a standing position thereon.
Figure 3:
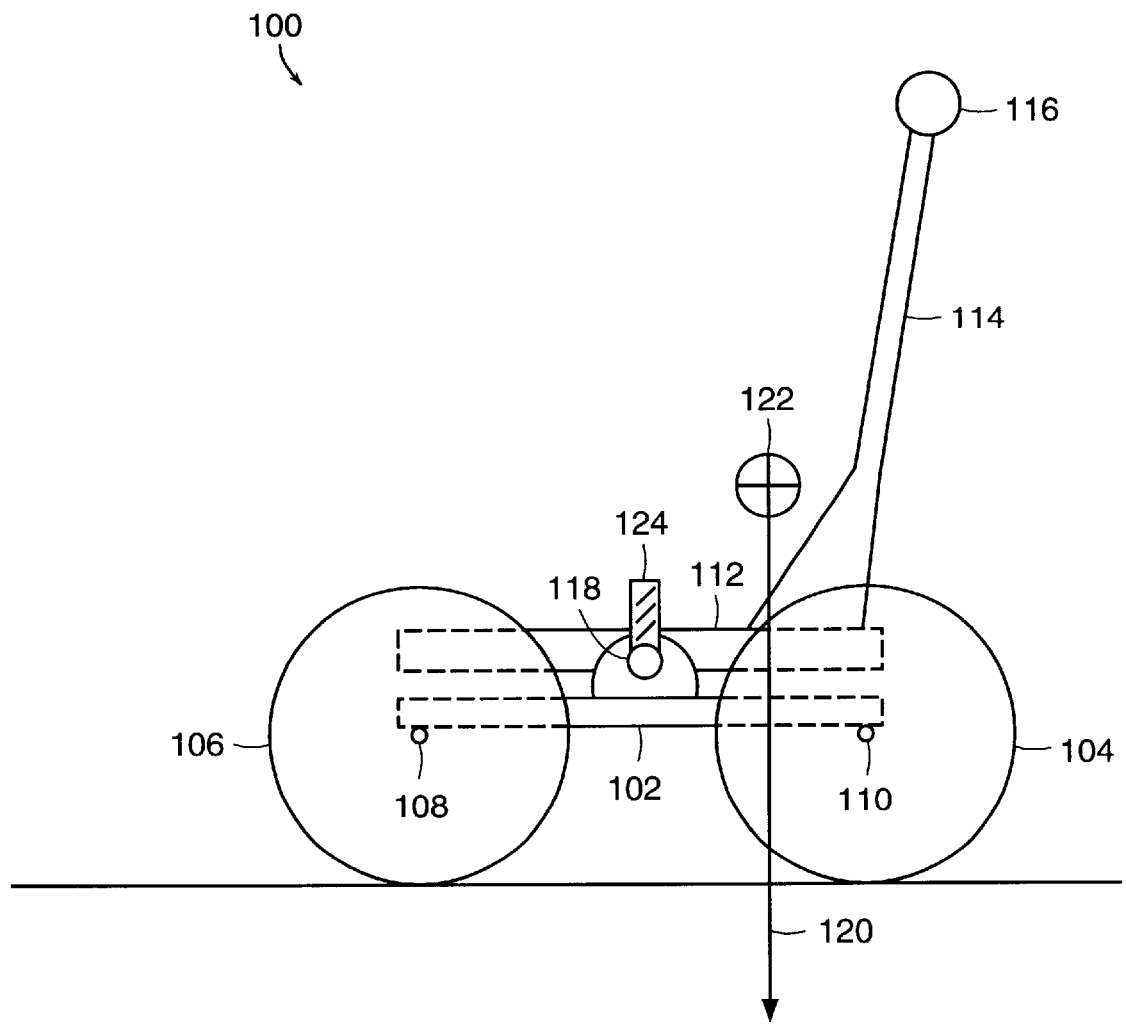
FIG. 3 is a side view of a personal vehicle having an independently suspended support platform in accordance with a preferred embodiment of the present invention.

FIG. 3 shows a simplified embodiment of a personal vehicle 100 having a drive platform 102 that is statically stable, at least on level ground 104. In addition to laterally disposed ground-contacting element 104 (only the right, or near, ground-contacting element is shown), one or more additional ground-contacting elements 106 are provided, additional ground-contacting element 106 having an axle 108 not coinciding with axle 110 of either of the other ground-contacting element.

While the term "wheel" is used in this application to refer to the ground-contacting elements of the vehicle, it is to be understood that this is without intent to limit the nature of the ground-contacting element that may be employed within the scope of the invention. It will be evident to persons of ordinary skill in the mechanical arts that clusters of wheels, arcuate members, tracks, or treads, to cite various examples, may be substituted for the wheels under appropriate conditions.

Wheels 104 help to define a series of axes including the vertical axis Z—Z, a lateral axis Y—Y parallel to the axis coincident with axle 110 of wheel 104, and a fore-aft axis X—X perpendicular to the wheel axis. The plane defined by the vertical axis ZZ and the lateral axis Y—Y will sometimes be referred to as the "lateral plane", and the plane defined by the fore-aft axis X—X and the vertical axis Z—Z will sometimes be referred to as the "fore-aft plane". Directions parallel to the axes X—X and Y—Y are called the fore-aft and lateral directions respectively.

The distance between axle 108 and axle 110 establishes the wheel base of vehicle 100. The wheel base may range from zero to over ten times a representative size of each wheel, however the wheel base is preferably in the range of one-half to four times the size of wheel 104. The sizes of the wheels 104 and 106 may be equal in size as shown, or may be unequal in size.

Drive platform 102 is pivotally connected to a support platform 112 that supports an occupant of the vehicle. The occupant of the vehicle may be positioned in any position on the support platform, for example, the occupant may stand on the support platform. A handle 114, coupled to support platform 112, may be provided, along with a grip 116 so that the vehicle 100 of this embodiment may be operated in a manner analogous to a scooter. A control loop may be provided so that leaning of the subject results in the application of torque to one or more of wheels 104 and 106 about respective axles 108 and 110, thereby causing an acceleration of the vehicle.

Under normal operating conditions, support platform 112 may pivot freely about pivot 118 fixed with respect to drive platform 102. In an alternate embodiment of the invention, pivoting of support platform 112 with respect to drive platform 102 may be limited to the fore-aft plane containing the vertical and the direction of forward motion. Within the plane of motion, pivoting of the support platform may be limited by travel stops coupled to drive platform 102 or by compliant members such as springs connecting drive platform 102 to support platform 112 at either or both of the fore and aft ends of the respective platforms. In a further alternate embodiment of the invention, support platform 112 may actively be driven by a rotary actuator 124 such as a motor. Under control of a control loop (discussed in detail below), the vertical balance of support platform 112 is maintained by driving drive platform 102 in the forward or backward direction.

Drive platform 102 may also respond to the commands of the user. User commands may be actuated, for example, by the operator shifting his or her weight forward or backward, or to one side or the other. In an embodiment wherein the support platform may pivot in a lateral direction, side lean by the operator may be used to determine the direction and rate of turning. Alternatively, the operator may actuate commands by means of a user input interface device, such as a joystick or dial attached, for example, to grip 116. Appropriate force transducers may be provided to sense leftward and rightward leaning and related controls provided to cause left and right turning as a result of the sensed leaning. The leaning may also be detected by measuring the pivot angle of support platform 112. Additionally, the force on each wheel may be measured using ground reaction force sensors. Similarly, the vehicle of this embodiment may be equipped with a foot-actuated switch to activate the vehicle, in such a manner that the switch is closed so as to power the vehicle automatically when the subject stands on the support platform 112.

In an emergency condition, the control loop may fail to operate, such as would occur if power were to fail. When such a condition is detected, pivot 118 may be locked, thereby forming a rigid connection between drive platform 102 and support platform 112. Locking of pivot 118 prevents support platform 112 and the user supported by the platform from pivoting in the fore-aft direction. As long as vector 120 (which is the resultant of gravity and of the fore-aft acceleration vector) acting on center of gravity 122 of the occupied vehicle 100 is over the wheel base of drive platform 102, the occupied vehicle is stable and will not tip over. If pivot 118 were not to lock under these circumstances, support platform 112 would be free to pivot forward or backward and, absent the compensating movement of drive platform 102 under the control of the control loop, support platform 112 and the supported subject would lose vertical stability abruptly.

While a pivot 118 is shown for coupling drive platform 102 and support platform 112, the use of any flexible linkage in place of pivot 118 is within the scope of the present invention as described herein and as claimed in any appended claims. For example, in accordance with a further embodiment of the present invention, the flexible connection may couple drive platform 102 to support platform 112 by means of springs or pneumatic pistons so as to provide a flexible coupling in normal powered operating mode and to urge the platforms 102 and 112 into locked relationship in case power or control is interrupted. In accordance with yet a further embodiment of the invention, a solenoid is activated during ordinary operation that unlocks a friction brake. If current to the solenoid is interrupted, a mechanical spring displaces the friction surface in such a manner as to lock pivot 118.

Figure 4:
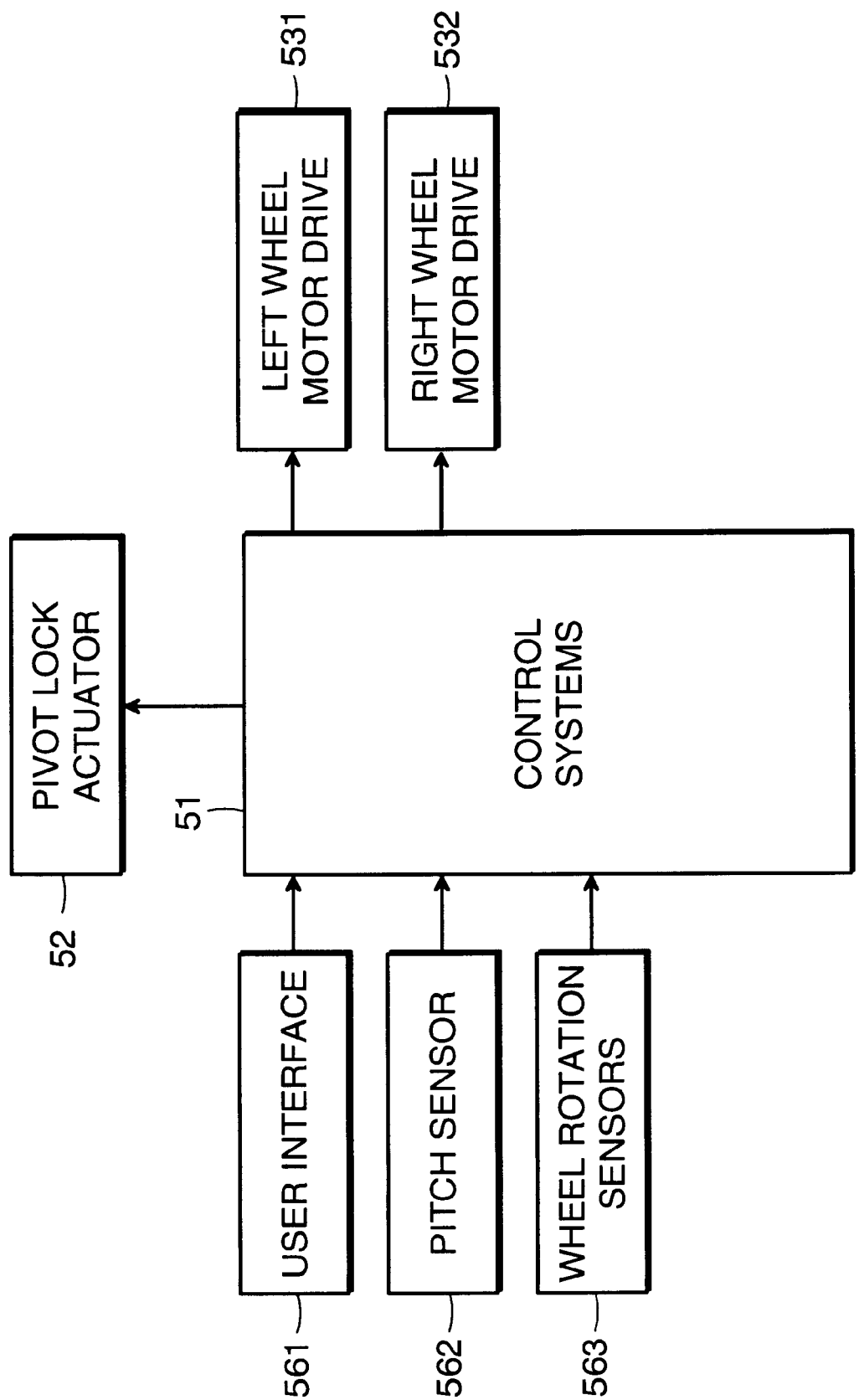
FIG. 4 is a block diagram showing generally the nature of sensors, power and control with the embodiment of FIG. 3.

In the block diagram of FIG. 4, a control system 51 is shown for controlling motor drives and actuators in the embodiment of FIG. 3 to achieve locomotion and balance. These include motor drives 531 and 532 for left and right wheels respectively, and pivot lock actuator 52, which may be present in certain embodiments of the invention. The control system has data inputs including user interface 561, pitch sensor 562 for sensing fore-aft pitch, and wheel rotation sensors 563. Pitch sensor 562 may be a sensor for measuring the inertial pitch (i.e., an angle with respect to gravity) of the support platform, or, alternately, a sensor for measuring pivot, i.e., the angle between the support platform and the drive platform.

Figure 5:
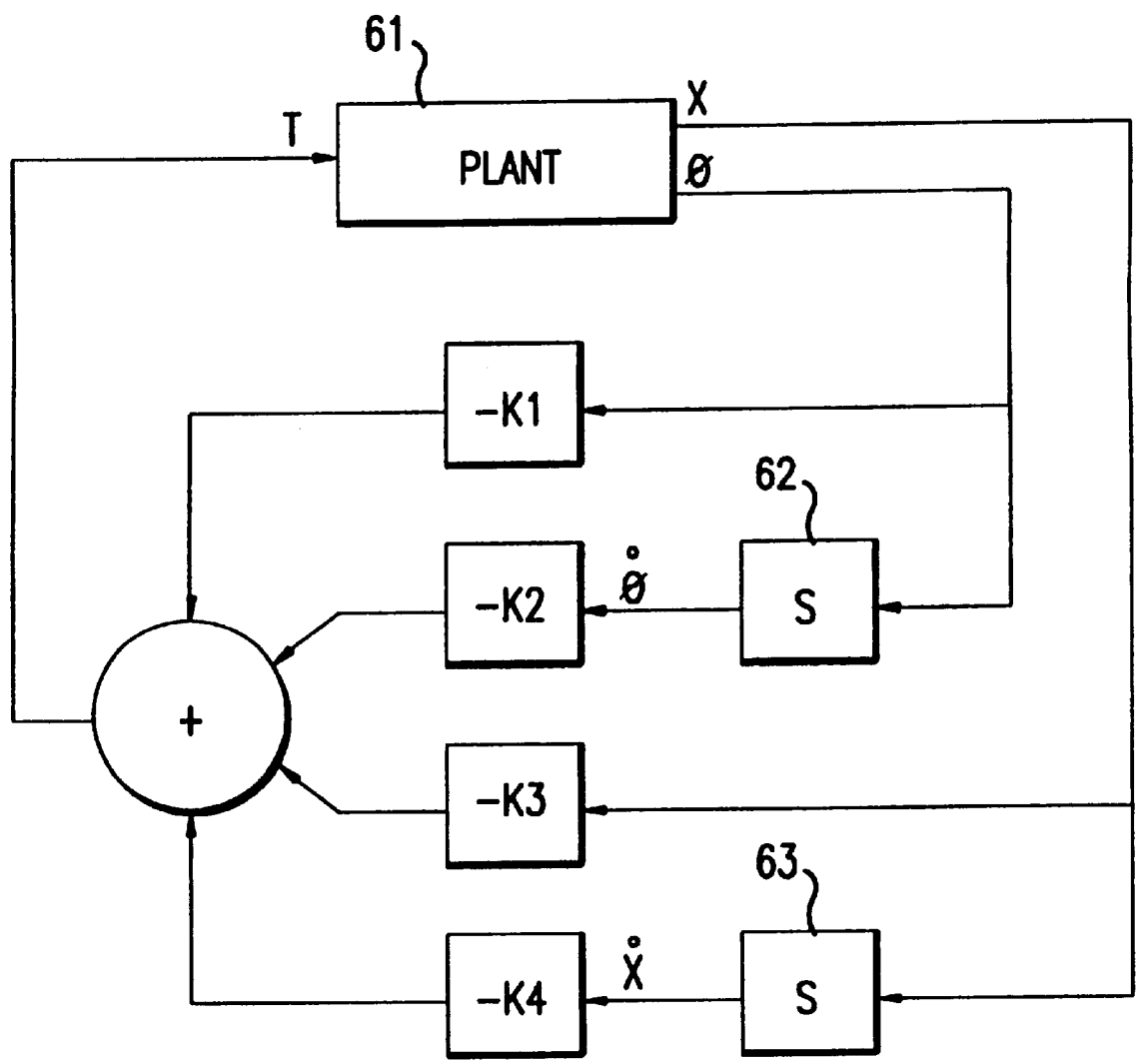
FIG. 5 illustrates the control strategy for a simplified version of FIG. 3 to achieve balance using wheel torque.

A simplified control algorithm for achieving balance in the embodiment of the invention according to FIG. 3 when the wheels are active for locomotion is shown in the block diagram of FIG. 5. Plant 61 is equivalent to the equations of motion of a system with a ground contacting module driven by a single motor, before the control loop is applied. The operation of control loops as depicted in FIG. 5 is well known in the art of electromechanical engineering, and is outlined, for example, in Fraser & Milne, *Electro-Mechanical Engineering,* IEEE Press (1994), particularly in Chapter 11, "Principles of Continuous Control," which is incorporated herein by reference. In FIG. 5, T identifies the wheel torque applied by a wheel drive to one or more of the wheels. The character $\theta$ identifies the fore-aft inclination (the pitch angle of the support platform with respect to gravity, i.e., the vertical), X identifies the fore-aft displacement along the surface relative to the reference point, and the dot over a character denotes a variable differentiated with respect to time. Alternatively, $\theta$ may identify the angle of pivot or the difference in weight supported by front and rear wheels. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is set to satisfy the following equation:

$$T = K_1(\theta + \theta_0) + K_2 \dot{\theta} + K_3(X + X_0) + K_4 \dot{x}$$

The gains $K_1$, $K_2$, $K_3$, and $K_4$ are dependent upon the physical parameters of the system and other effects such as gravity, while offsets $\theta_0$ and $X_0$ may be specified by the operating mode of the system, such as to limit the speed of the vehicle, or, alternatively, may be set by the user by means of a user input device. The simplified control algorithm of FIG. 5 maintains balance of the support platform and also proximity of the vehicle to the reference point on the surface in the presence of disturbances such as changes to the system's center of mass with respect to the reference point on the surface due to body motion of the subject or contact with other persons or objects. For sustained locomotion of the vehicle, for example, K3 may be set to zero, or X (or $X_0$) constantly reset. $K_3$ is set to zero to enable lean control of the fore-aft motion. If an external input device such as a joystick is used, the input device may be used to reset the desired position $X_0$.

In order to accommodate two driven wheels instead of the one-wheel system illustrated in FIG. 5, the torque desired from the left motor and the torque desired from the right motor can be calculated separately in the general manner described below in connection with FIG. 8. Additionally, tracking both the left wheel motion and the right wheel motion permits adjustments to be made to prevent unwanted turning of the vehicle and to account for performance variations between the two drive motors.

Figure 6:
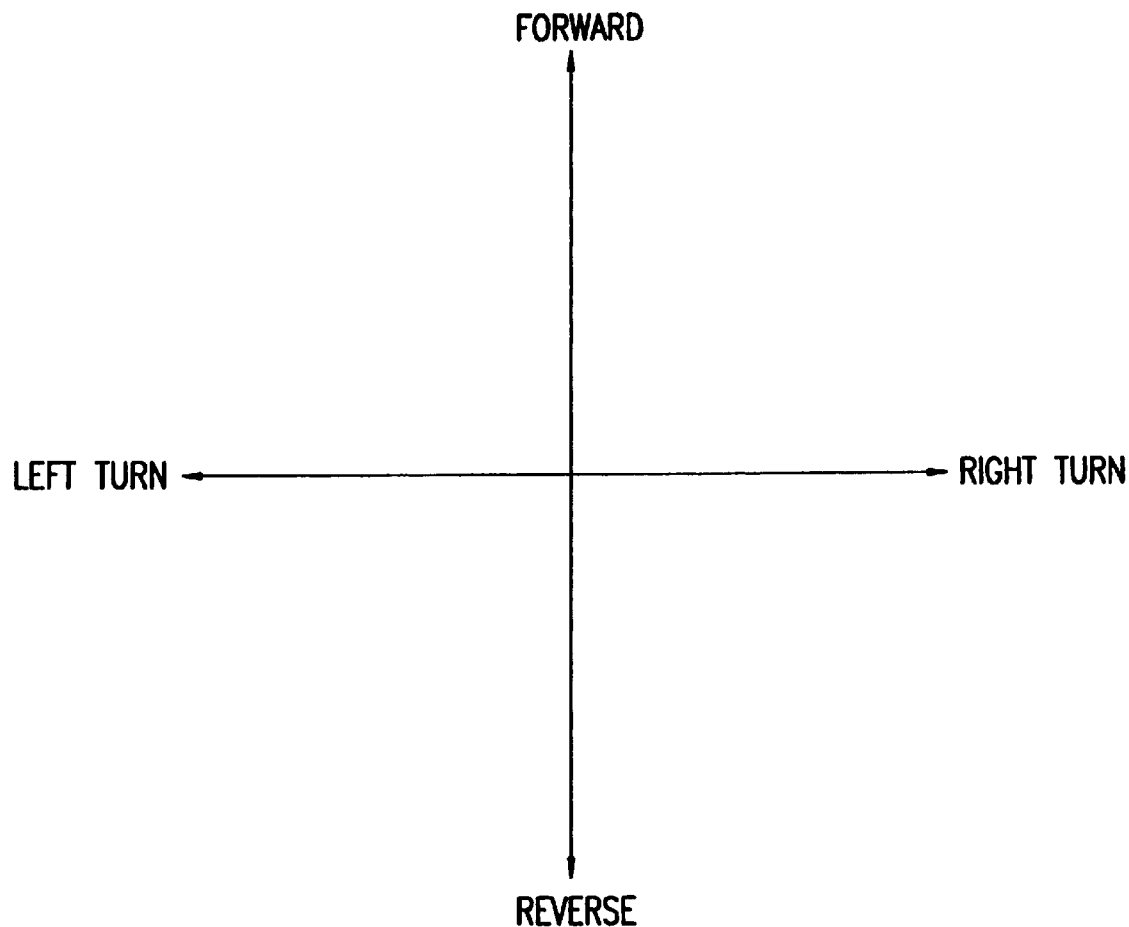
FIG. 6 illustrates diagrammatically the operation of joystick control of the wheels of the embodiment of FIG. 3.

A manual interface such as a joystick is used to adjust the torques of each motor. The joystick has axes indicated in FIG. 6. In operation of this embodiment, forward motions of the joystick is used to cause forward motion of the vehicle, and reverse motion of the joystick causes backward motion of the vehicle. A left turn similarly is accomplished by leftward motion of the joystick. For a right turn, the joystick is moved to the right. The configuration used here permits the vehicle to turn in place when the joystick is moved to the left or to the right. With respect to forward and reverse motion an alternative to the joystick is simply leaning forward or backward, since the pitch sensor (measuring $\theta$) identifies a pitch change, provides an input, as amplified (and, more generally, as signal conditioned) by amplifier K1 (shown in FIG. 5), to the summer defining torque T to be applied to one or more wheels, thereby leading to forward or reverse motion, depending on the direction of lean. Alternatively, control strategies based on fuzzy logic can be implemented.

It can be seen that the approach of adjusting motor torques permits fore-aft stability to be achieved. In other words, stability is achieved dynamically, by motion of the components of the vehicle (in this case constituting the entire vehicle) relative to the ground.

Figure 7:
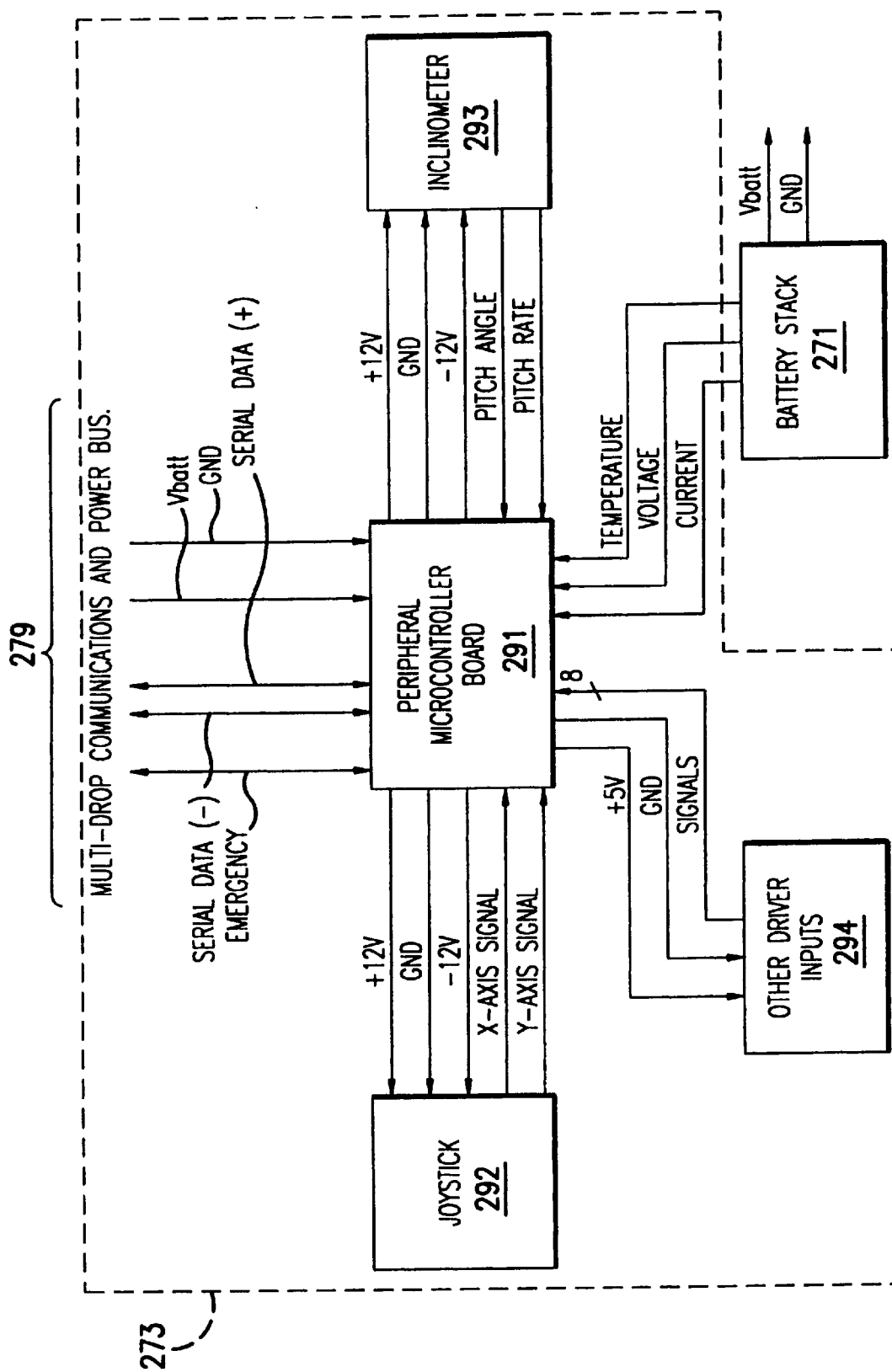
FIG. 7 is a block diagram providing detail of a driver interface assembly.

FIG. 7 is a block diagram providing detail of an implementation of a driver interface assembly designated generally by numeral 273. A peripheral microcomputer board 291 receives an input from joystick 292 as well as from inclinometer 293. The inclinometer provides information signals as to pitch and pitch rate. (The term "inclinometer" as used in this context throughout this description and in the accompanying claims means any device, including accelerometers, pivot angle sensors, gyroscopes, ground force sensors, or any combination thereof, providing an output indicative of pitch or pitch rate, regardless of the arrangement used to achieve the output; if only one of the pitch and pitch rate variables is provided as an output, the other variable can be obtained by suitable differentiation or integration with respect to time.) To permit controlled banking into turns by the vehicle (thereby to increase stability while turning) it is also feasible to utilize a second inclinometer to provide information as to roll and roll rate or, alternatively, the resultant of system weight and centrifugal force. Other inputs 294 may also be desirably provided as an input to the peripheral micro controller board 291. Such other inputs may include signals gated by switches (knobs and buttons) for chair adjustment, in embodiments where a chair is provided, and for determining specialized modes of operation. Peripheral micro controller board 291 also has inputs for receiving signals from a battery stack 271 as to battery voltage, battery current, and battery temperature. The peripheral micro controller board 291 is in communication over bus 279 with the central micro controller board 272.

Figure 8:
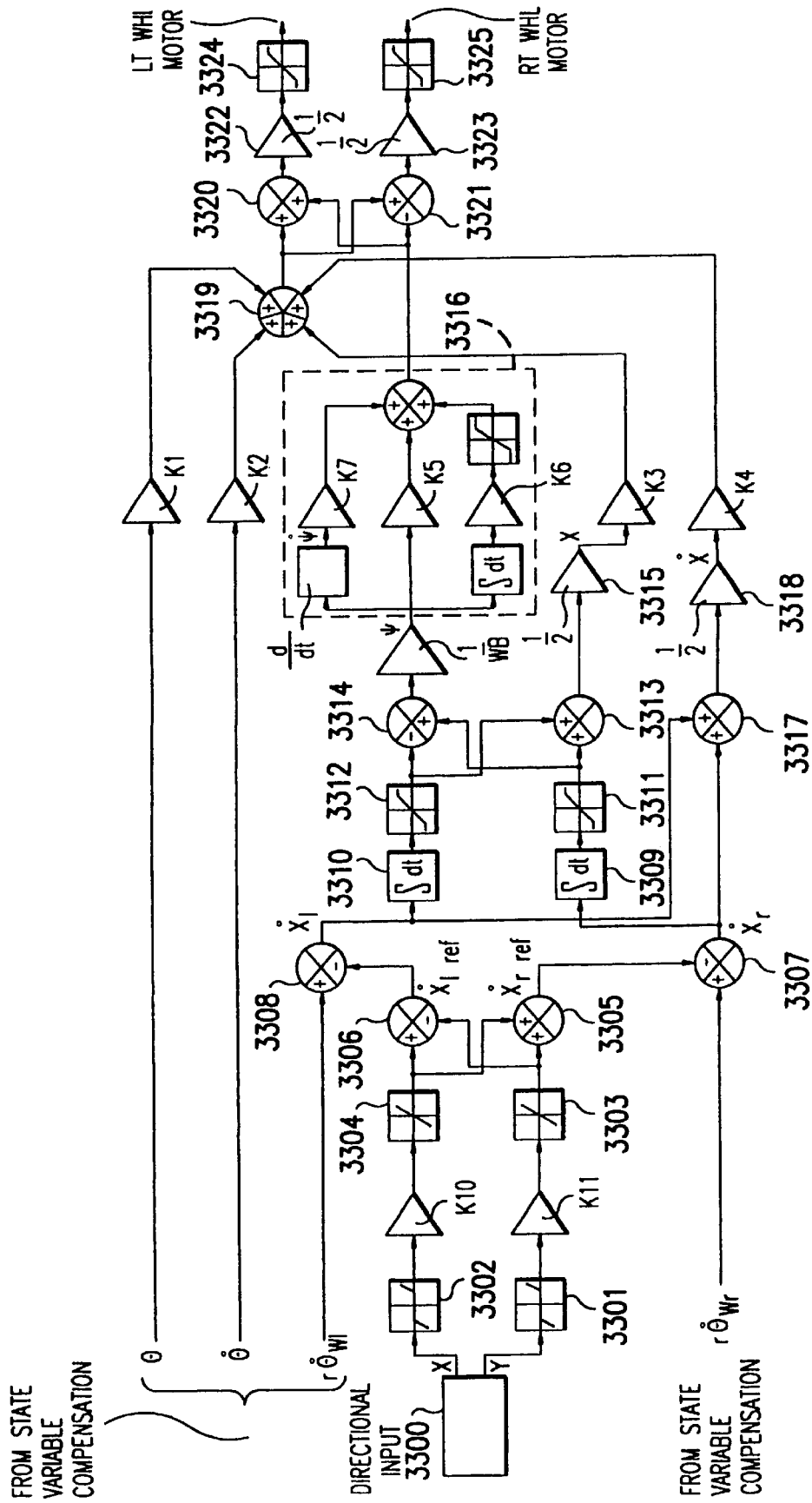
FIG. 8 is a schematic of the wheel motor control during balancing and normal locomotion.

FIG. 8 shows a control arrangement for the motors of the right and left drive wheels (corresponding to items 110 of FIG. 3). The arrangement has inputs of $\theta$, $\dot{\theta}$, $\dot{r\theta}_{wl}$ (linear velocity of the left wheel relative to the world coordinate system) and $\dot{r\theta}_{wr}$ (linear velocity of the right wheel), in addition to directional inputs 3300 determined by joystick position along X and Y axes of a reference coordinate system. Inputs $\theta$, $\dot{\theta}$, and error signals x and $\dot{x}$ (described below), subject to gains K1, K2, K3, and K4 respectively, become inputs to summer 3319, which produces the basic balancing torque command for the wheels, in the general manner described above in connection with FIG. 5 above. The output of summer 3319 is combined with the output of yaw PID loop 3316 (described below) in summer 3320, then divided in divider 3322 and limited in saturation limiter 3324, to produce the left wheel torque command. Similarly, the output of summer 3319 is combined with the output of PID loop 3316 in summer 3321, then divided in divider 3323 and limited in saturation limiter 3325, to produce the right wheel torque command.

In FIG. 8, a directional input along the X axis moves the reference coordinate system along its X axis relative to the world coordinate system (which represents the traveled surface), at a velocity proportional to the displacement of the joystick. A directional input along the Y axis rotates the reference coordinate system about its Z axis at an angular velocity proportional to the displacement of the joystick. It will be appreciated that motion of the joystick in the positive X direction is here interpreted to mean forward motion;

motion of the joystick in the negative X direction means reverse motion. Similarly, motion of the joystick in the positive Y direction means leftward turning, counter-clockwise as viewed from above; motion of the joystick in the negative Y direction means rightward turning clockwise as viewed from above. Hence the directional inputs Y and X are given deadband via deadband blocks 3301 and 3302 respectively, to widen the neutral position of the joystick, then subject to gains K11 and K10, then rate-limited by limiters 3303 and 3304 respectively, which limit the angular and linear accelerations respectively of the reference coordinate system. The sum of these outputs achieved through summer 3305 becomes the reference velocity $\dot{x}_{r\,ref}$ whereas the difference of these outputs achieved through summer 3306 becomes the reference velocity $\dot{x}_{l\,ref}$. These reference velocities are subtracted in summers 3308 and 3307 from compensated linear velocity input signals $r\dot{\theta}_{wl}$ and $r\dot{\theta}_{wr}$ for left and right wheels (see description below in connection with FIG. 35 for these quantities) to obtain velocity error signals $\dot{x}_l$ and $\dot{x}_r$ for left and right wheels within the reference coordinate system. In turn the average of these signals, determined via summer 3317 and divider 3318, produces a linear velocity error signal $\dot{x}$. Displacement error signal x is derived by integrating $r\dot{\theta}_{wl}$ and $r\dot{\theta}_{wr}$ in integrators 3310 and 3309, limiting the results in saturation limiters 3312 and 3311, and then averaging their outputs via summer 3313 and divider 3315. The difference between these displacements, determined via summer 3314, produces the yaw error signal $\psi$.

The yaw error signal $\psi$ is run through a standard proportional-plus-integral-plus-derivative (PID) control loop 3316, the output of which is combined with the output of the basic balancing torque command of summer 3319, to produce the individual wheel torque commands, which cause the wheels to maintain fore-aft stability and also cause the vehicle to align itself with the axes of, and follow the origin of, the reference coordinate system as directed by directional input 3300.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A vehicle, for transporting a human subject over a surface that may be irregular, the vehicle comprising:
   a. a support platform for supporting the subject, the support platform defining fore-aft and lateral planes;
   b. a ground-contacting module pivotably attached to the support platform for suspending the support platform over the surface, the ground-contacting module stable to tipping both fore and aft while stationary, the support platform unstable to tipping in the fore-aft plane while the ground-contacting module is stationary;
   c. a motorized drive arrangement, mounted to at least one of the ground contacting module and the support platform, for causing locomotion of the ground contacting module over the surface; and
   d. a control loop, in which the motorized drive arrangement is included, for dynamically maintaining stability of the support platform to tipping in the fore-aft plane by operation of the motorized drive arrangement in such a manner as to cause a specified acceleration of the ground contacting module.

2. A vehicle in accordance with claim 1, further comprising a pivot for pivotal coupling of the support platform to the ground-contacting module.

3. A vehicle in accordance with claim 2, wherein the ground-contacting module includes at least one wheel aft of a vertical line through the pivot and at least one wheel forward of the vertical line while on level ground.

4. A vehicle in accordance with claim 1, further comprising a locking mechanism for restricting motion of the support platform with respect to the ground-contacting module.

5. A vehicle in accordance with claim 4, wherein the locking mechanism for restricting motion of the support platform is activated upon interruption of power to the control loop.

6. A vehicle in accordance with claim 1, further comprising an actuator for adjusting a pivot angle of the support platform with respect to the ground-contacting module.

7. A vehicle in accordance with claim 1, wherein the ground-contacting module comprises:
   a. a first wheel rotatable about a first axis; and
   b. a second wheel rotatable about a second axis, the second axis being non-colinear with the first axis.

8. A vehicle according to claim 1, wherein the control loop is configured so that fore and aft motion of the vehicle is controlled by fore and aft leaning of the support platform.

9. A vehicle according to claim 1, further comprising a handle mounted to the support platform.

10. A method for controlling a vehicle, the method comprising:
   a. providing the vehicle of claim 1;
   b. measuring a pivot angle of the support platform with respect to the ground-contacting module;
   c. governing the motorized drive arrangement on the basis at least of the pivot angle of the support platform in such a manner as to cause a specified acceleration of the vehicle.

* * * * *